United States Patent
Balling

[19]

[11] Patent Number: 5,881,320
[45] Date of Patent: Mar. 9, 1999

[54] ONE-TIME-USE CAMERA WITH MULTI-ADAPTER FIXTURE FOR MOTOR AND SELF TIMER

[75] Inventor: Edward N. Balling, Rochester, N.Y.

[73] Assignee: Eastman Kodak Company, Rochester, N.Y.

[21] Appl. No.: 54,291

[22] Filed: Apr. 2, 1997

[51] Int. Cl.[6] .............................. G03B 1/00; G03B 17/02; G03B 17/40
[52] U.S. Cl. .............................. 396/6; 396/388; 396/418; 396/474; 396/541
[58] Field of Search .............................. 396/6, 388, 418, 396/387, 541, 535, 472, 473, 474, 264

[56] References Cited

U.S. PATENT DOCUMENTS

| | | | |
|---|---|---|---|
| 3,280,713 | 10/1966 | Goldberg | 396/388 |
| 3,831,184 | 8/1974 | Morse | 396/474 |
| 4,152,065 | 5/1979 | Kobori | 396/435 |
| 5,565,945 | 10/1996 | Tobise et al. | 396/6 |
| 5,608,486 | 3/1997 | Takagi et al. | 396/6 |

Primary Examiner—W. B. Perkey
Attorney, Agent, or Firm—Roger A. Fields

[57] ABSTRACT

A camera to be used with a film advance motor and/or a self timer, comprising a main body part having an engageable portion, and a single-piece multi-adapter fixture having an engageable portion constructed to be connected with the engageable portion of the main body part to secure the single-piece multi-adapter fixture to the main body part, having another separate portion constructed to hold the film advance motor, and having another separate portion constructed to hold the self timer, in order to support the film advance motor and/or the self timer on the main body part to permit the camera to be used either with the film advance motor or the self timer or with the film advance motor and the self timer.

8 Claims, 13 Drawing Sheets

ONE-TIME-USE CAMERA WITH MULTI-ADAPTER FIXTURE FOR MOTOR AND SELF TIMER

FIELD OF THE INVENTION

The invention relates generally to the field of photography, and in particular to cameras with a motor and/or a self timer. More specifically, the invention relates to a one-time-use camera with a multi-adapter fixture that allows a camera manufacturer to readily add a motor and/or self timer to a one-time-use camera and permits removal of the motor and/or self timer from the one-time-use camera, in order to recycle the motor and self timer, after the one-time-use camera is used.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in another chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior art U.S. Pat. No. 5,565,945 issued Oct. 15, 1996 suggests adding a film winding motor to the one-time-use camera in place of the thumbwheel. The motor is connected to the main body part, adjacent the cartridge receiving chamber, and can be disconnected from the main body part to be recycled after the one-time camera is used.

SUMMARY OF THE INVENTION

A camera to be used with a film advance motor and/or a self timer, comprising:

a main body part having an engageable portion; and a single-piece multi-adapter fixture having an engageable portion constructed to be connected with the engageable portion of the main body part to secure the single-piece multi-adapter fixture to the main body part, having another separate portion constructed to hold the film advance motor, and having another separate portion constructed to hold the self timer, in order to support the film advance motor and/or the self timer on the main body part to permit the camera to be used either with the film advance motor or the self timer or with the film advance motor and the self timer.

DETAILED DESCRIPTION OF THE INVENTION

The invention is disclosed as being embodied preferably in a onetime-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 3:
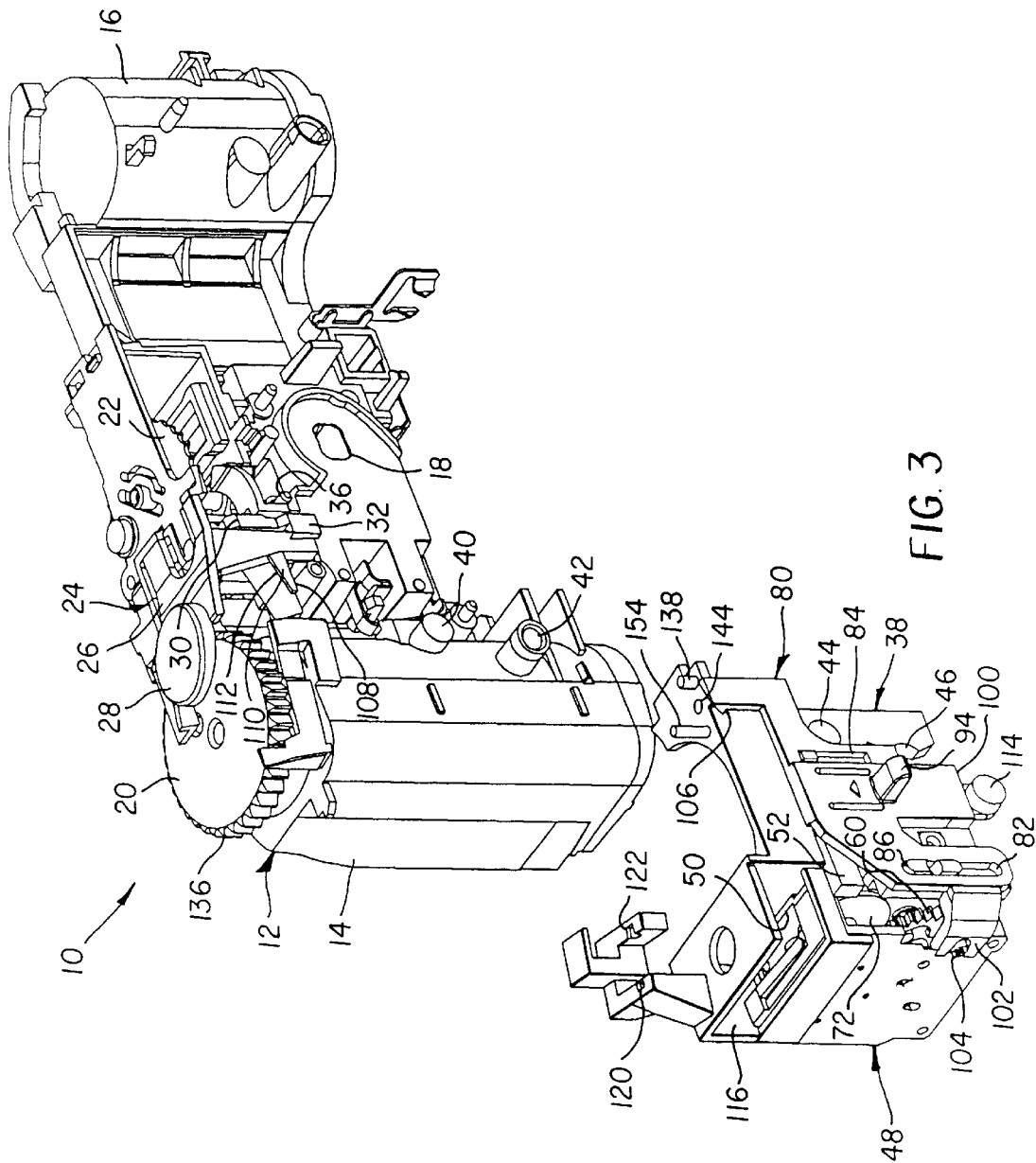
FIG. 3 is an exploded perspective view of the camera and the multi-adapter fixture with the self timer assembled to the multi-adapter fixture.

Referring now to the drawings, FIG. 3 partially shows a one-time-use camera 10 including a main body part 12. The main body part 12 has one end portion 14 that defines a rearwardly open cartridge receiving chamber (not shown) and another end portion 16 that defines an unexposed film roll chamber (not shown). A front exposure aperture 18 is located between the end portions 14 and 16 for admitting ambient light to expose successive sections of a filmstrip (not shown) originally stored in roll form in the unexposed film roll chamber. A film winding thumbwheel 20 is rotatably supported in coaxial engagement with the film spool in a film cartridge (not shown) within the cartridge receiving chamber to wind each exposed section of the filmstrip into the film cartridge. An exposure counter 22 provides a current count of the film sections that remain to be exposed.

A known shutter blade (not shown) is pivotally supported on the main body part 12 for pivotal opening and closing movement to momentarily uncover and then recover the exposure aperture 18 to expose each film section. A torsion return spring (not shown) urges the shutter blade to recover the exposure aperture 18. Opening movement of the shutter blade would be clockwise in FIG. 3, and closing movement of the shutter blade would be counter-clockwise in FIG. 3

Figure 5:
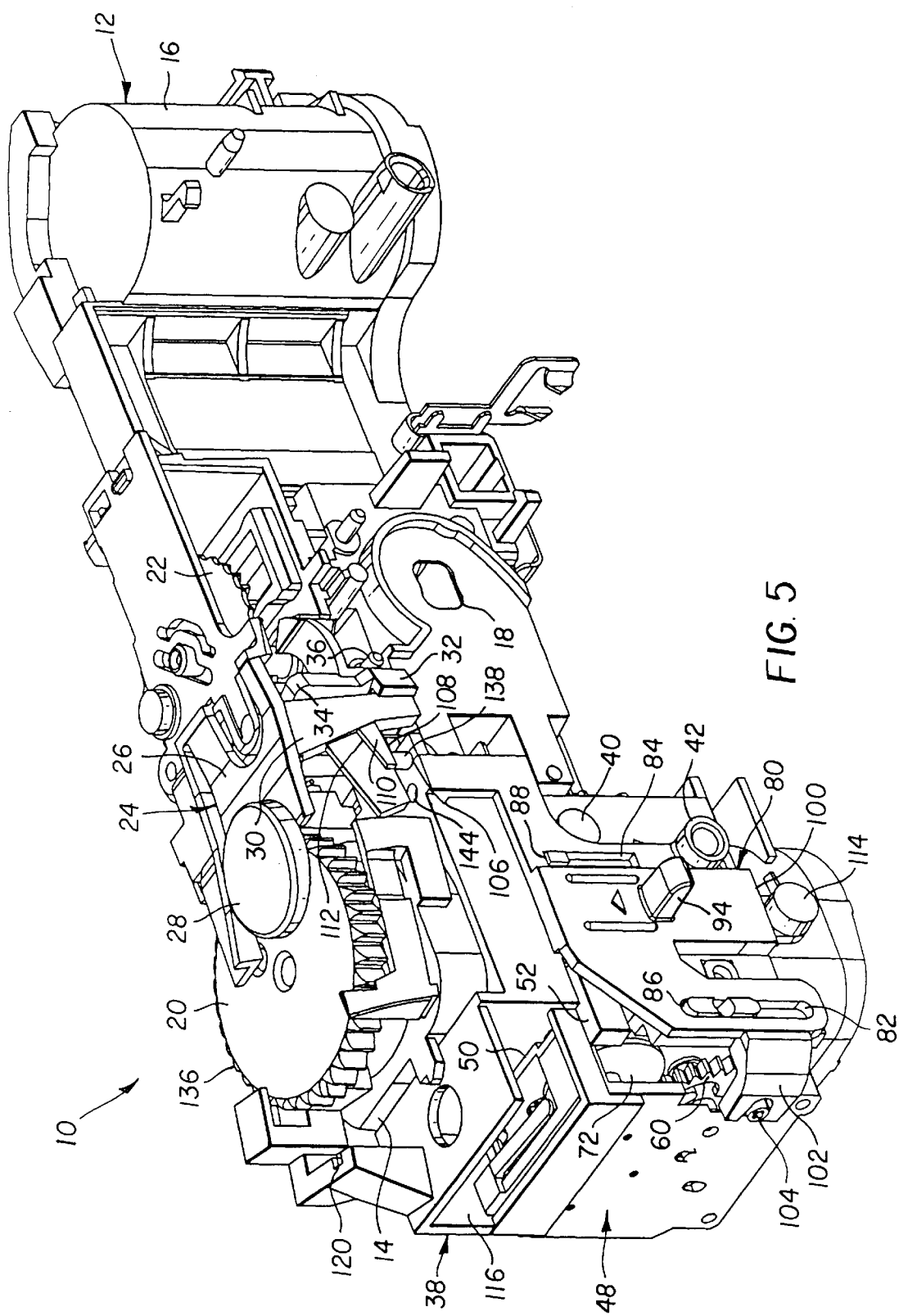
FIG. 5 is an assembled perspective view similar to FIG. 4, showing manual depression of a manual shutter release.

A shutter release component 24, shown in FIG. 3, is secured to the main body part 12 and has a resilient cantilevered beam 26 with a free end that is a manually depressible shutter release button 28. An actuating finger 30 depends from the cantilevered beam 26 to extend behind a right-angled tab 32 on a known metering lever 34. The metering lever 34 is pivotally supported on the main body part 12 and normally engages a known spring-driven high energy lever 36, pivotally supported on the main body part, to hold the high energy lever against the spring urging. As viewed in FIG. 5, when the shutter release button 28 is manually depressed, the cantilevered beam 26 is bent (beginning at the shutter release button) to make the actuating finger 30 swing counter-clockwise and in turn pivot the metering lever 34 counter-clockwise. When the metering lever 34 is pivoted counter-clockwise, it releases the high energy lever 36 which then briefly strikes the shutter blade (not shown) to pivot the shutter blade open to uncover the exposure aperture 18. The torsion return spring (not shown) for the shutter blade pivots the shutter blade closed to recover the exposure aperture 18.

Figure 1:
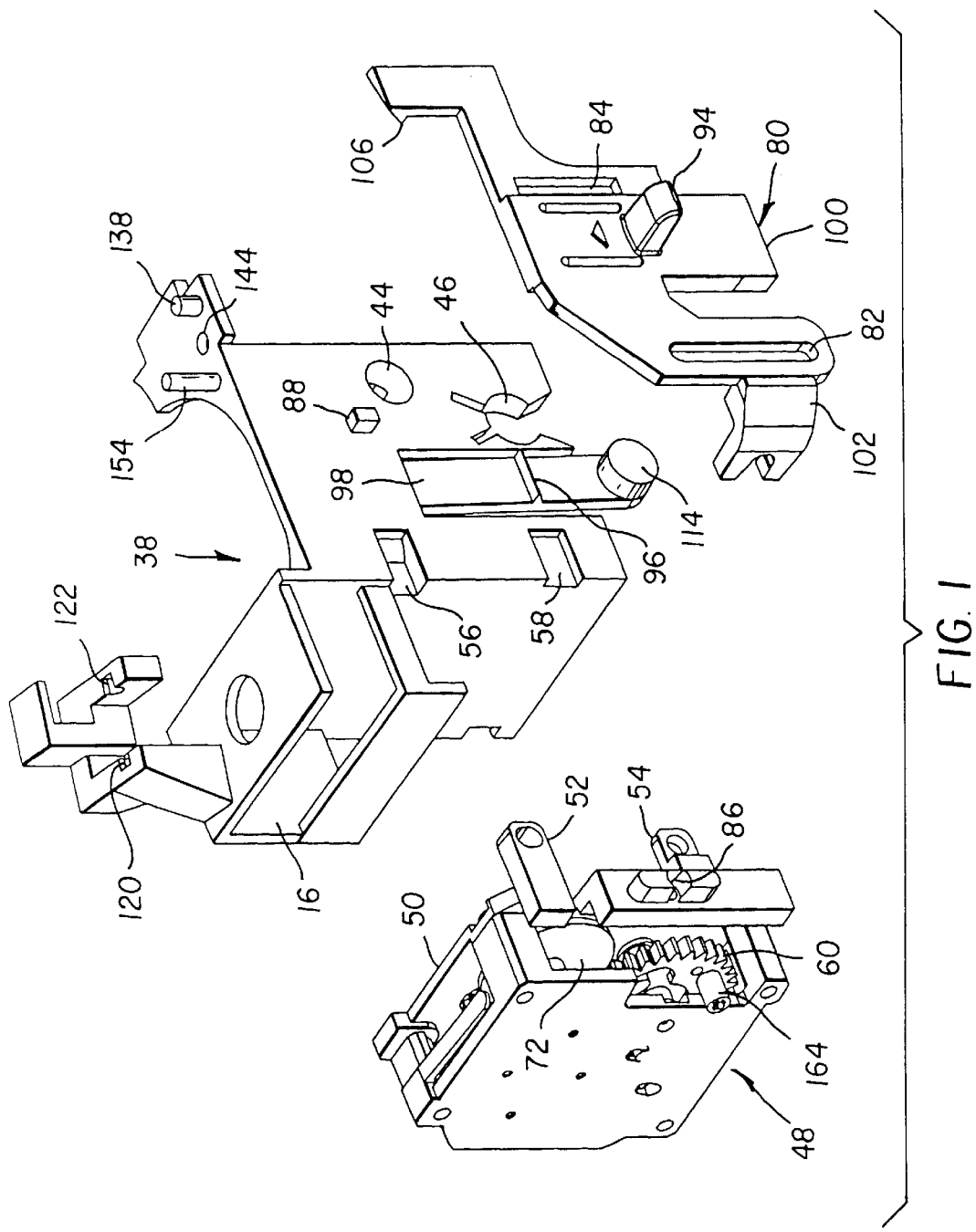
FIG. 1 is an exploded perspective view of a single-piece multi-adapter fixture for supporting a film advance motor and/or a self timer in a camera, and a self timer to be assembled to the multi-adapter fixture, according to a preferred embodiment of the invention.
Figure 2:
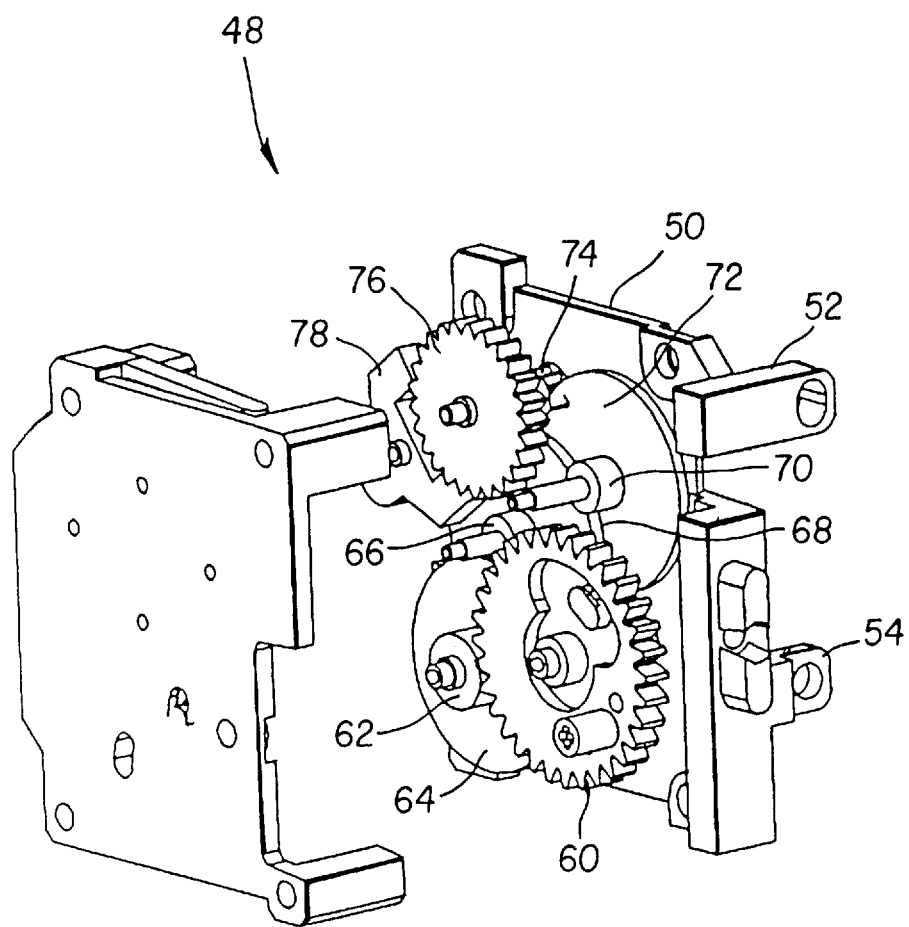
FIG. 2 is an exploded perspective view of the self timer.
Figure 4:
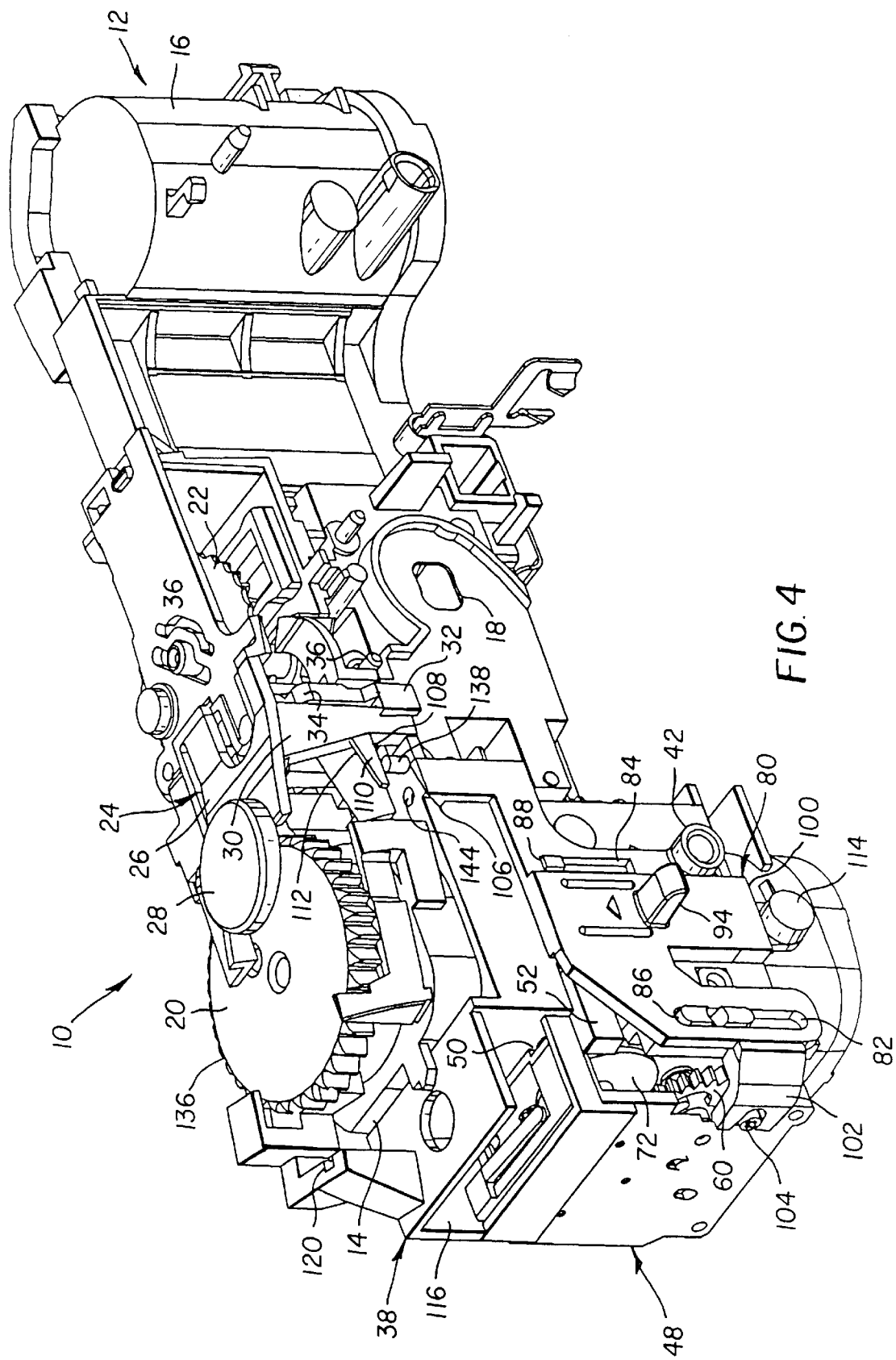
FIG. 4 is an assembled perspective view similar to FIG. 3.

As shown in FIGS. 1, 3 and 4, a single-piece multi-adapter fixture or mount 38 can be secured to the end portion 14 of the main body part 12 by means of two integral projections 40 and 42 on the end portion that extend through respective holes 44 and 46 in the multi-adapter fixture. The two projections 40 and 42 can be simultaneously removed from the respective holes 44 and 46 to easily separate the multi-adapter fixture 38 from the end portion 14, to permit the multi-adapter fixture to be recycled after the one-time-use camera 10 is used.

As shown in FIGS. 1–4, a known timer 48 includes a base plate 50 with two integral arms 52 and 54 that are fit into respective recesses 56 and 58 in the multi-adapter fixture 38 to secure the timer to the multi-adapter fixture. Preferably, when the timer 48 is to be included in the one-time-use camera 10, it is secured to the multi-adapter fixture 38 before the multi-adapter fixture is secured to the end portion 14 of the main body part 12. See FIG. 3. The two arms 52 and 54 can be simultaneously removed from the respective recesses 56 and 58 to easily separate the timer 48 from the multi-adapter fixture 38, to permit the timer 48 to be recycled after the one-time-use camera 10 is used. See FIG. 1. Several meshing gears are rotationally supported on the base plate 50. These are a timer gear 60 that is urged clockwise in FIGS. 1 and 2 by a torsion return spring (not shown), a first pinion gear 62 in mesh with the timer gear, a first spur gear 64 coaxial with the first pinion gear, a second pinion 66 gear in mesh with the first spur gear, a second spur gear 68 coaxial with the second pinion gear, a third pinion gear 70 in mesh with the second spur gear, a third spur gear 72 coaxial with the third pinion gear, a fourth pinion gear 74 in mesh with the third spur gear, and a fifth spur gear 76 coaxial with the fourth pinion gear. See FIG. 2. An escapement 78 is pivotally supported on the base plate 50 to pivot back and forth into engagement with the fifth spur gear 76.

Figure 6:
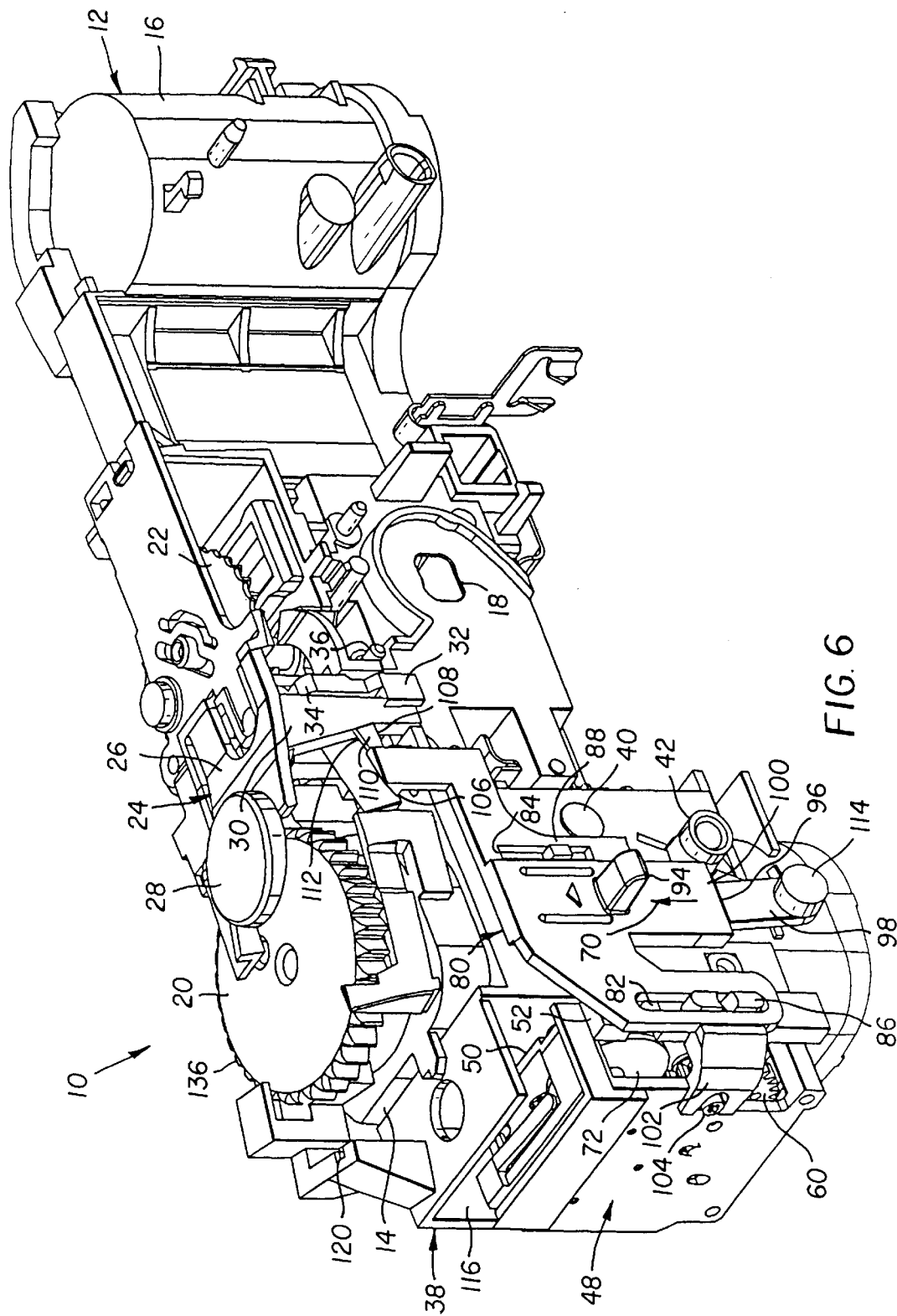
FIG. 6 is an assembled perspective view similar to FIG. 4, showing the self timer being manually set for operation.
Figure 8:
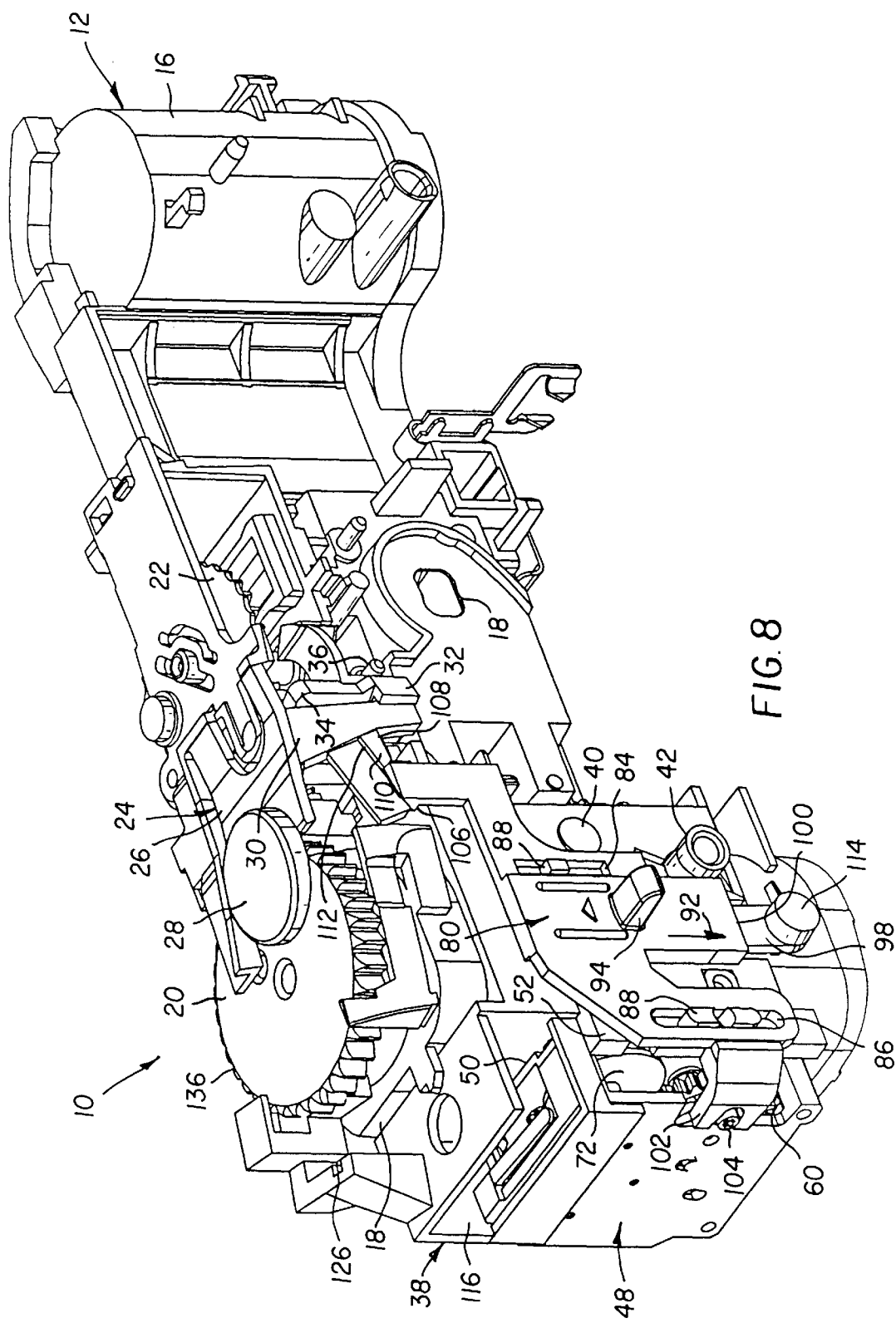
FIG. 8 is a an assembled perspective view similar to FIG. 6, showing operation of the self timer.

A setting slide 80 has respective slots 82 and 84 in which are located a projection 86 on the base plate 50 and a projection 88 on the multi-adapter fixture 38, to permit translation of the setting slide in forward and reverse directions indicated by the arrows 90 in FIG. 6 and 92 in FIG. 8. The setting slide 80 is secured to the multi-adapter fixture 38 when the timer 48 is to be included on the multi-adapter fixture. See FIGS. 3 and 4. The two projections 86 and 88 can be simultaneously removed from the respective slots 82 and 84 to easily separate the setting slide 80 from the multi-adapter fixture 38, to permit the setting slide to be recycled after the one-time-use camera 10 is used. See FIG. 1.

Figure 7:
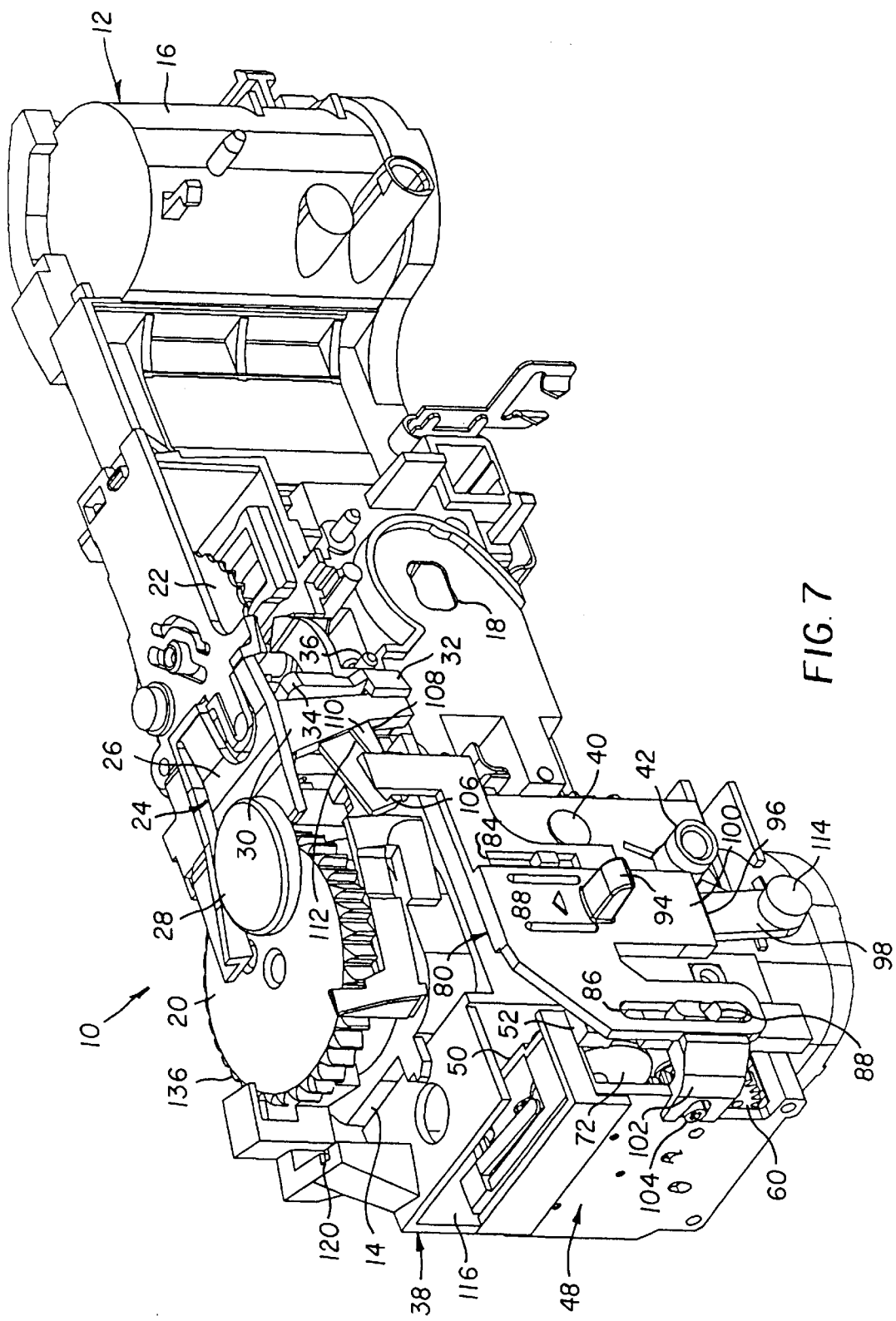
FIG. 7 is a an assembled perspective view similar to FIG. 6, showing manual depression of the manual shutter release when the self timer is set for operation.

When a knob 94 is manually pushed in the forward direction 90, as shown in FIG. 6, the setting slide 80 is similarly moved to a cocked position, shown in FIGS. 6 and 7, in which a catch 96 on a resilient cantilevered beam 98 of the multi-adapter fixture 38 engages one end 100 of the setting slide to prevent the setting slide from being returned in the reverse direction 92. As the setting slide 80 is translated in the forward direction 90 to its cocked position, a right-angled extension 102 of the setting slide in continuous engagement with a lug 104 on the timer gear 60 rotates (i.e. winds up) the timer gear counter-clockwise 126° in FIG. 6 against the contrary urging of the torsion return spring (not shown) for the timer gear and a hook 106 on the setting slide is moved from a closer side 108 of a follower 110 on the actuating finger 30 to a farther side 112 of the follower (i.e. closer to and farther from the hook before the hook is moved). Since the hook 106 has been moved past (beyond) the farther side 112 of the follower 110, the shutter release button 28 can be manually depressed to pivot the actuating finger 30 counter-clockwise in FIG. 7 and cause the high energy lever 36 to briefly strike the shutter blade (not shown) to pivot the shutter blade open to momentarily uncover the exposure aperture 18. This is shown in FIG. 7. Alternatively as shown in FIG. 8, a setting release button 114 at a free end of the cantilevered beam 98 can be manually depressed to separate the catch 96 from the end 100 of the setting slide 80. Consequently, the torsion return spring for the timer gear 60 rotates (i.e. winds down) the timer gear clockwise 126° in FIG. 8 for about 12 seconds to translate the setting slide 80 in the reverse direction 92 and cause the hook 106 to bear against the farther side 112 of the follower 110 and pivot the actuating finger 30 counter-clockwise in FIG. 8 and cause the high energy lever 36 to briefly strike the shutter blade (not shown) to pivot the shutter blade open to momentarily uncover the exposure aperture 18.

Figure 9:
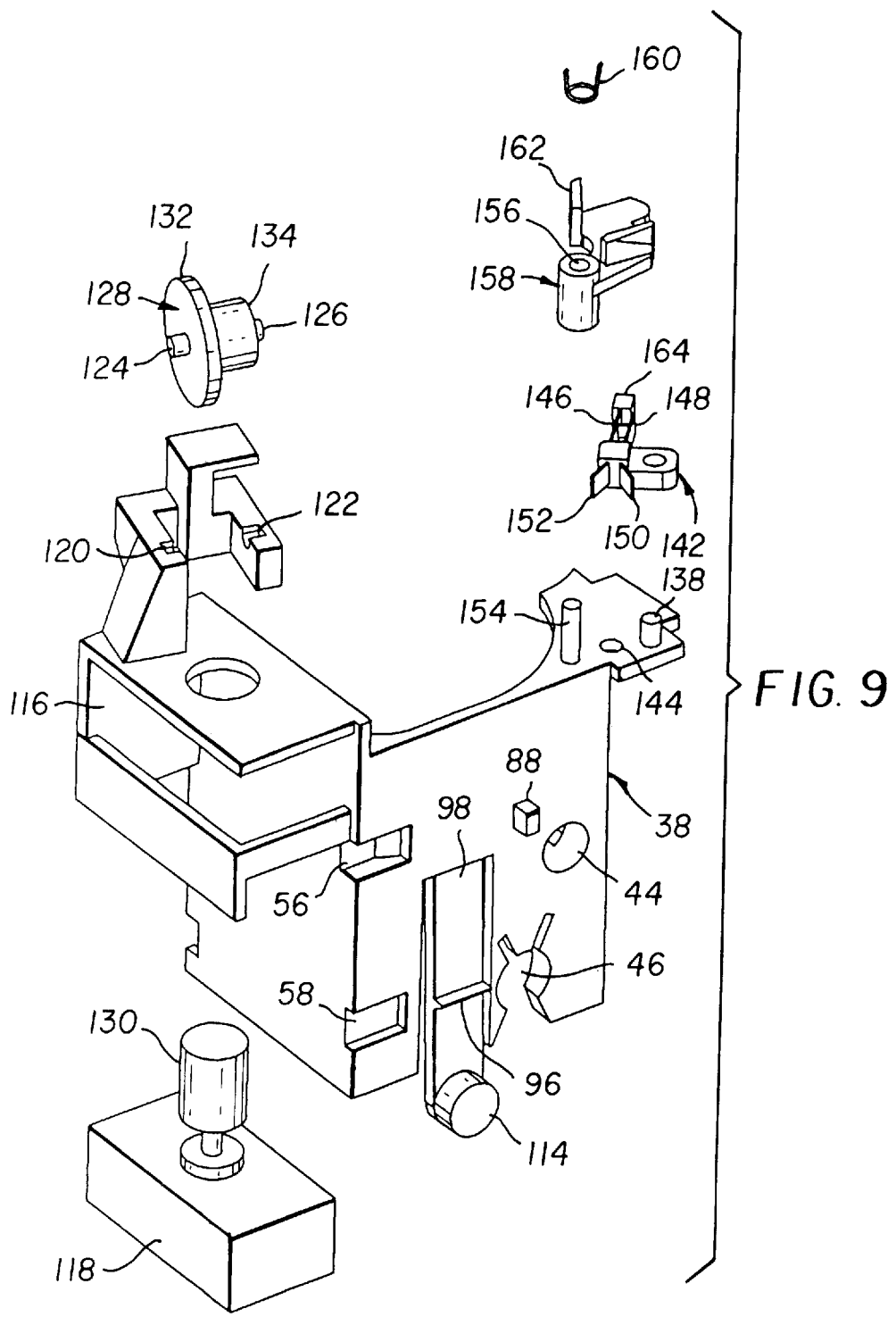
FIG. 9 is an exploded perspective view of the multi-adapter fixture and the film advance motor to be assembled to the multi-adapter fixture.
Figure 10:
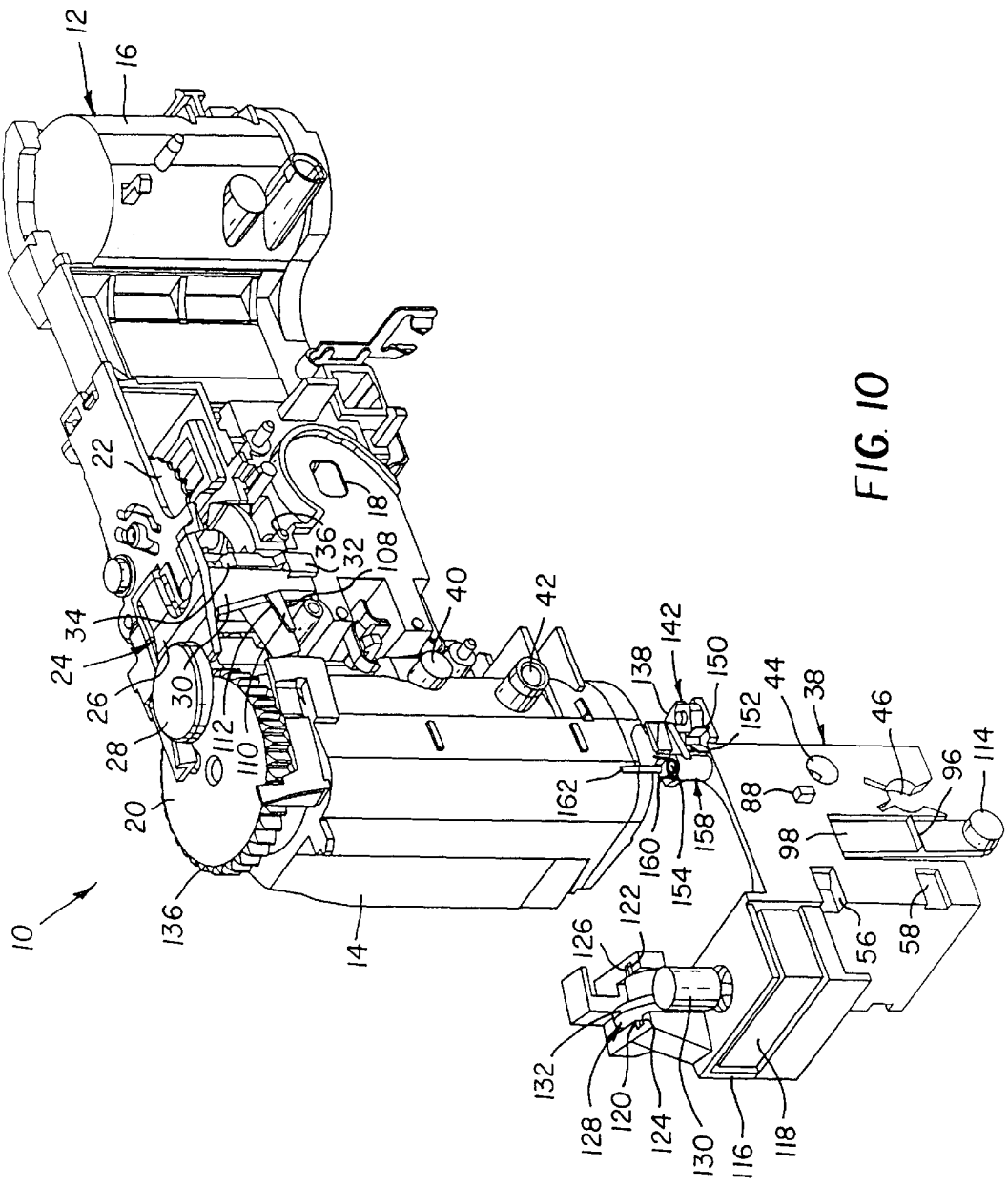
FIG. 10 is an exploded perspective view of the camera and the multi-adapter fixture with the film advance motor assembled to the multi-adapter fixture.
Figure 11:
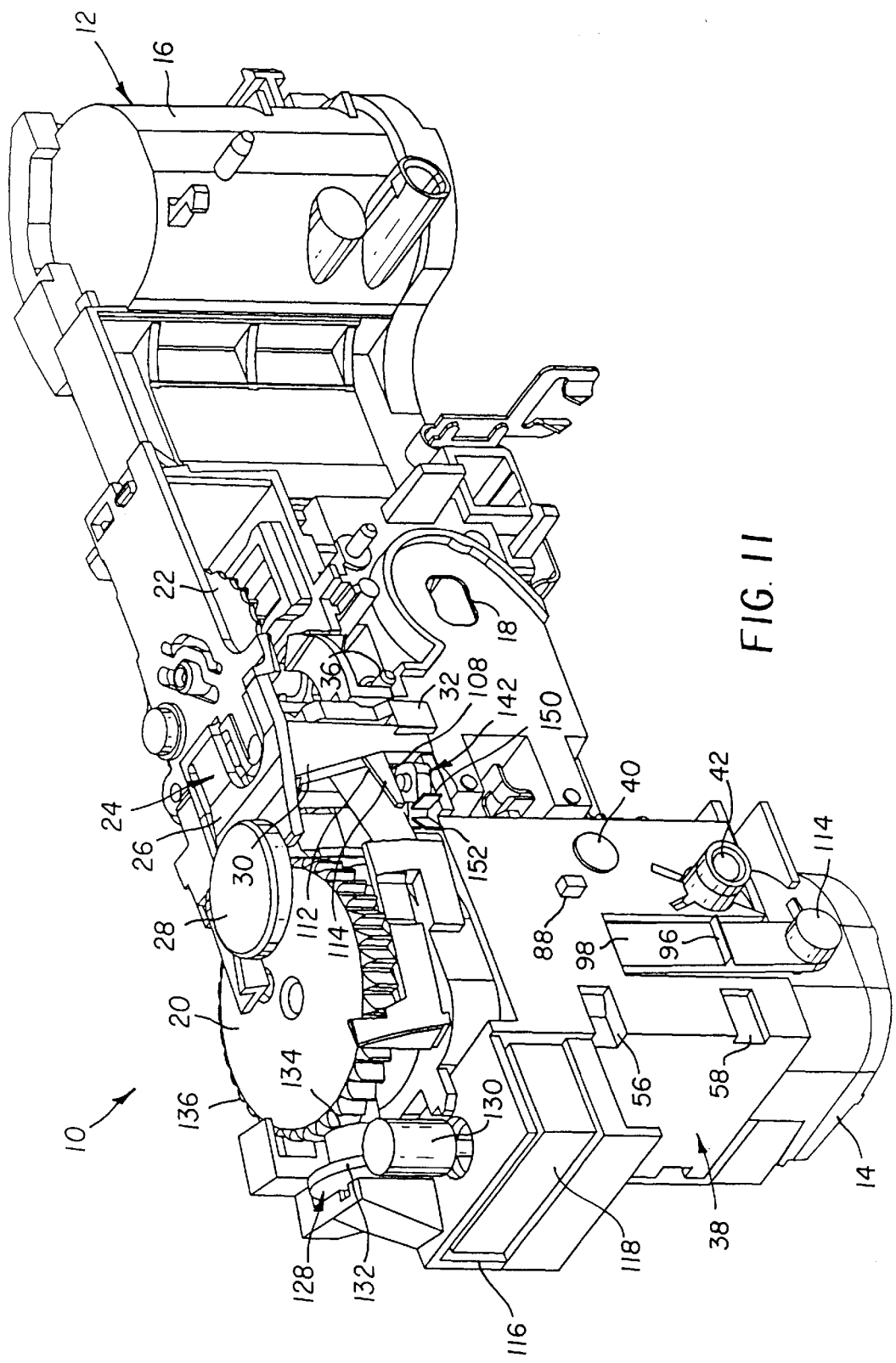
FIG. 11 is an assembled perspective view similar to FIG. 10.

As shown in FIGS. 9–11, the multi-adapter fixture 38 has an open pocket 116 for receiving a direct current film advance motor 118 and a pair of aligned cradle slots 120 and 122 for receiving respective coaxial shaft ends 124 and 126 to rotatably support a combination gear 128. Preferably, when the film advance motor 118 is to be included in the one-time-use camera 10, the film advance motor is inserted into the pocket 116 and the shaft ends 124 and 126 are inserted into the cradle slots 120 and 122 before the multi-adapter fixture 38 is secured to the end portion 14 of the main body part 12. See FIG. 10. A worm gear 130, which the film advance motor 118 directly rotates, meshes with a gear ring 132 of the combination gear 128 to in turn rotate the combination gear. A face gear 134 of the combination gear 128 meshes with a toothed periphery 136 of the film winding thumbwheel 20 to rotate the thumbwheel to in turn rotate the film spool in the film cartridge (not shown) within the cartridge receiving chamber to wind each exposed section of the filmstrip into the film cartridge. See FIG. 11. The film advance motor 118 can be easily removed from the pocket 116 to permit the motor to be recycled after the one-time-use camera 10 is used. Similarly, the shaft ends 124 and 126 of the combination gear 128 can be easily removed from the cradle slots 120 and 122 to permit the combination gear to be recycled after the one-time-use camera 10 is used. See FIG. 9.

As shown in FIGS. 9–11, the multi-adapter fixture 38 has an integral projection 138 that is received in a hole 140 in a motor on/off switch 142 and a hole 144 that receives a projection (not shown) on the underside of the motor on/off switch to secure the motor on/off switch to the multi-adapter fixture when the film advance motor 118 is to be included on the multi-adapter fixture. The projection 138 can be removed from the hole 140 and the other projection can be removed from the hole 144 to easily separate the motor on/off switch 142 from the multi-adapter fixture 38, to permit the motor on/off switch to be recycled after the one-time-use camera 10 is used. See FIG. 9. The motor on/off switch 142 has a resilient switch contact 146 that is inherently urged against a stationary switch contact 148 to close the motor on/off switch. Separation of the resilient switch contact 146 from the stationary switch contact 148 opens the motor on/off switch 142. The motor on/off switch 142 has one lead 150 connected to the positive terminal of a battery (not shown) and another lead 152 connected to the film advance motor 118. The film advance motor 118 is separately connected to the negative terminal of the battery. When the motor on/off switch 142 is closed, the film advance motor 118 is powered on. When the motor on/off switch 142 is opened, the film advance motor 118 is deactivated.

As shown in FIGS. 9–11, the multi-adapter fixture 38 has an integral projection 154 that is received in a hole 156 in a switch actuator 158 to pivotally support the switch actuator on the multi-adapter fixture when the film advance motor 118 is to be included on the multi-adapter fixture. The projection 154 can be removed from the hole 156 to easily separate the switch actuator 158 from the multi-adapter fixture 38, to permit the switch actuator to be recycled after the one-time-use camera 10 is used. See FIG. 9. A torsion spring 160 biases the switch actuator 158 to hold a projection 162 on the switch actuator continuously against a cam surface (not shown) on the metering lever 34. A tab (not shown) on the underside of the switch actuator 158 abuts a block-like free end 164 of the resilient switch contact 162 to hold the resilient switch contact separated from the stationary switch contact 148, to maintain the motor on/off switch 142 open. When the metering lever 34 is pivoted counter-clockwise in FIG. 11, and the shutter blade (not shown) has been closed to recover the exposure aperture 18, the cam surface on the metering lever pivots the switch actuator 158 clockwise in FIG. 9 to retract the tab on the switch actuator from against the block-like free end 164 of the resilient switch contact 146. This allows the resilient switch 146 contact to move against the stationary switch contact 148 to close the motor on/off switch 142 to in turn power on the film advance motor 118. When the metering lever 34 is pivoted clockwise back to its original position in FIG. 11, the cam surface on the metering lever pivots the switch actuator 158 counter-clockwise in FIG. 9 to return the tab on the switch actuator against the block-like free end 164 of the resilient switch contact 146 and separate the resilient switch contact from the stationary switch contact 148 to re-open the motor on/off switch 142 and deactivate the film advance motor 118.

Figure 12:
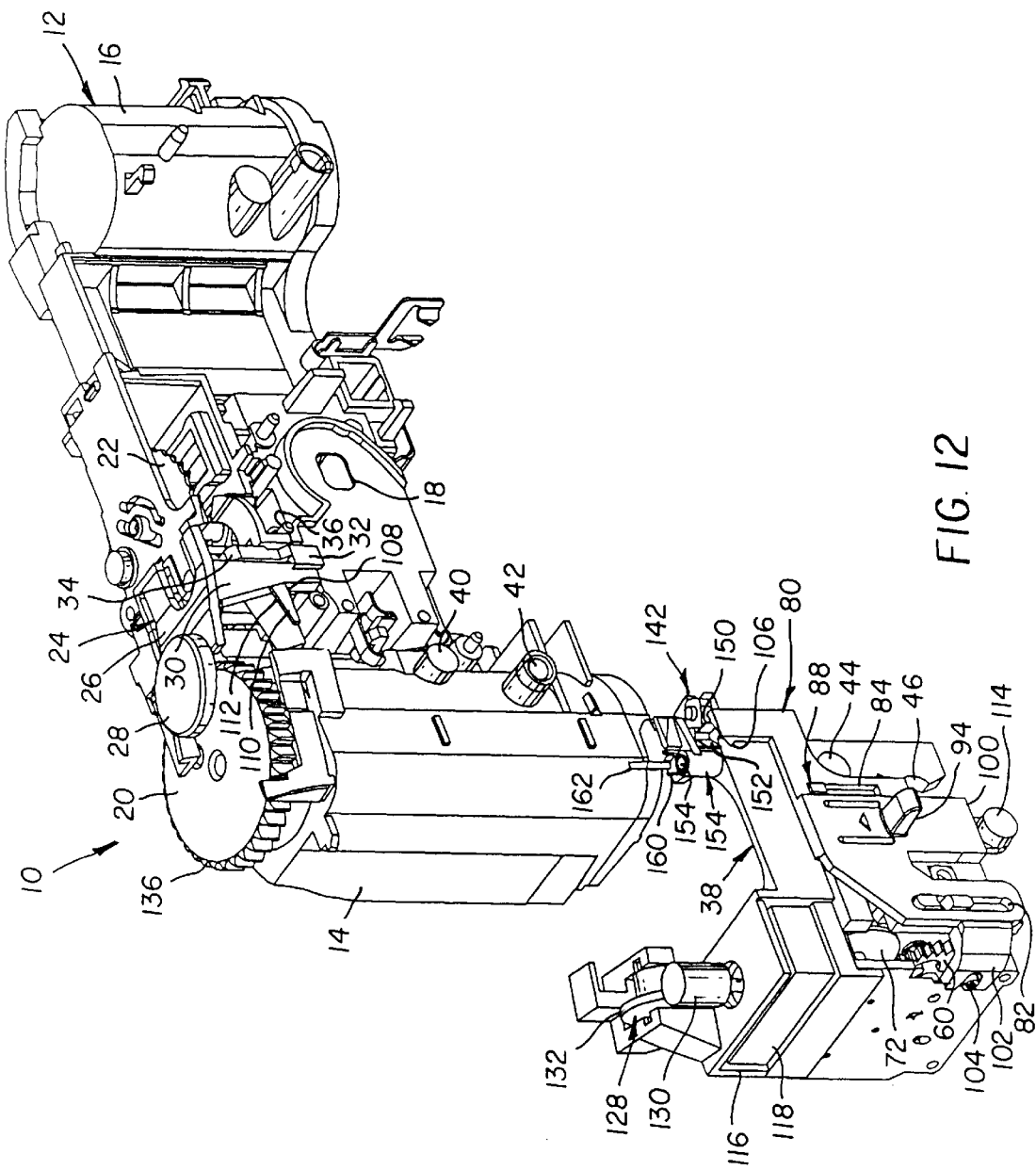
FIG. 12 is an exploded perspective view of the camera and the multi-adapter fixture with the self timer and the film advance motor assembled to the multi-adapter fixture.
Figure 13:
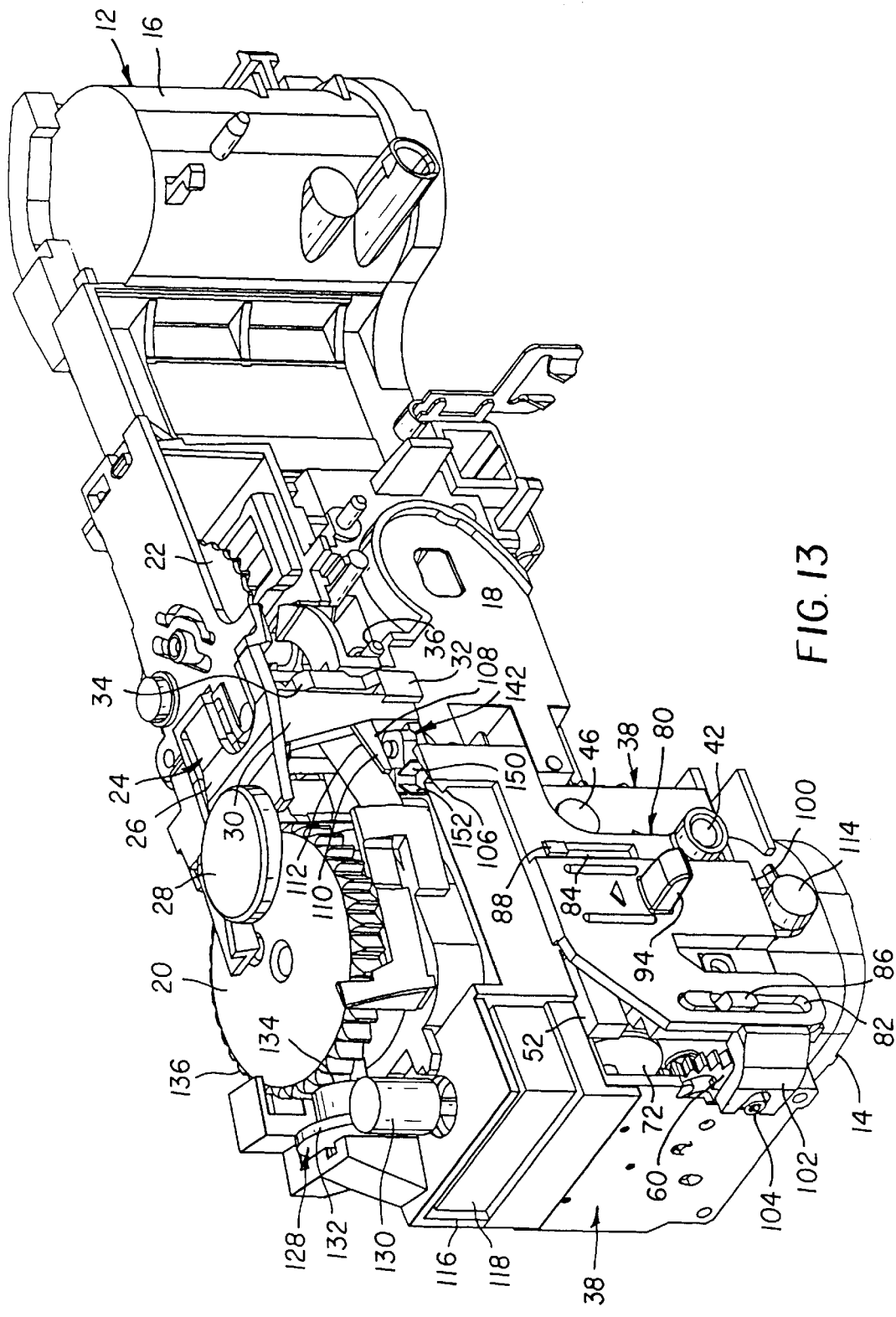
FIG. 13 is an assembled perspective view similar to FIG. 12.

As shown in FIGS. 11 and 12, the timer 48 and the film advance motor 118 can both be included in the one-time-use camera 10.

Thus, the multi-adapter fixture 38 allows a camera manufacturer to readily add the film advance motor 118 and/or the self timer 48 to the one-time-use camera 10 and permits removal of the film advance motor and/or the self timer from the one-time-use camera, in order to recycle the motor and self timer, after the one-time-use camera is used.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. one end portion
16. another end portion
18. front exposure aperture
20. film winding thumbwheel
22. exposure counter
24. shutter release component
26. cantilevered beam
28. shutter release button
30. actuating finger
32. right-angled tab
34. metering lever
36. high energy lever
38. single-piece multi-adapter fixture or mount
40. projection
42. projection
44. hole
46. hole
48. timer
50. base plate
52. arm
54. arm
56. recess
58. recess
60. timer gear
62. first pinion gear
64. first spur gear
66. second pinion gear
68. second spur gear
70. third pinion gear
72. third spur gear
74. fourth pinion gear
76. fifth spur gear
78. escapement
80. setting slide
82. slot
84. slot
86. projection
88. projection 90. forward direction
92. reverse direction
94. knob
96. catch
98. cantilevered beam
100. one end
102. right-angled extension
104. lug
106. hook
108. closer side
110. farther side
112. follower
114. setting release button
116. pocket
118 film advance motor
120. cradle slot
122. cradle slot
124. shaft end
126. shaft end
128. combination gear
130. worm gear
132. gear ring
134. face gear
136. toothed periphery
138. projection
140. hole
142. motor on/off switch
144. hole
146. resilient switch contact
148. stationary switch contact
150. lead
152. lead
154. projection
156. hole
158. switch actuator
160. torsion spring
162. projection
164. block-like free end

What is claimed is:

1. A camera to be used with a film advance motor and/or a self timer, comprising:
   a main body part having an engageable portion; and
   a single-piece multi-adapter fixture having an engageable portion constructed to be connected with said engageable portion of said main body part to secure said single-piece multi-adapter fixture to said main body part, having another separate portion constructed to hold the film advance motor, and having another separate portion constructed to hold the self timer, in order to support the film advance motor and/or the self timer on said main body part to permit said camera to be used either with the film advance motor or the self timer or with the film advance motor and the self timer.

2. A camera as recited in claim 1, wherein said portion of said single-piece multi-adapter fixture constructed to hold the film advance motor is constructed to release the film advance motor, and wherein said portion of said single-piece multi-adapter fixture constructed to hold the self timer is constructed to release the self timer.

3. A multi-adapter fixture for supporting a film advance motor and/or a self timer in a camera, comprising:
   a single-piece mount having at least one portion constructed to be connected with the camera, at least another separate portion constructed to hold the film advance motor, and at least another separate portion constructed to hold the self timer, in order to support the film advance motor and/or the self timer in the camera to permit the camera to be used either with the film advance motor or the self timer or with the film advance motor and the self timer.

4. A multi-adapter fixture as recited in claim 3, wherein said single-piece mount has at least one portion constructed to be connected with a manual setting device to support the setting device for movement along said single-piece mount to set the self timer.

5. A one-time-use camera comprising a main body part having one end portion that defines a cartridge receiving chamber and another end portion that defines an unexposed film roll chamber, and a film winding motor located at said end portion that defines the cartridge receiving chamber, is characterized by:
   a self timer; and
   a multi-adapter fixture located at said end portion of said main body part that defines the cartridge receiving chamber, which holds said film winding motor and said self timer to support said film winding motor and said self timer on said main body part and which is constructed to release said film winding motor and said self timer to permit said film winding motor and said self timer to be recycled after said one-time-use camera is used.

6. A method of assembling a camera that has a film drive motor and a self timer, said method comprising the following steps in any order:
   connecting a single-piece multi-adapter fixture to a main body part of the camera;
   connecting the film drive motor to the single-piece multi-adapter fixture; and
   connecting the self timer to the single-piece multi-adapter fixture.

7. A method as recited in claim 6, comprising the additional step:
   connecting a manual setting device to the single-piece multi-adapter fixture to support the setting device for movement along the single-piece multi-adapter to set the self timer.

8. A method as recited in claim 7, wherein the step of connecting the manual setting device to the single-piece multi-adapter fixture is performed after the step of connecting the self timer to the single-piece multi-adapter fixture.

* * * * *

UNITED STATES PATENT AND TRADEMARK OFFICE
CERTIFICATE OF CORRECTION

PATENT NO. : 5,881,320
DATED : March 9, 1999
INVENTOR(S) : Edward N. Balling

It is certified that error appears in the above-identified patent and that said Letters Patent is hereby corrected as shown below:

On the titl epage, item [22] Filing date, should read -- April 2, 1998--

Signed and Sealed this

Fourth Day of January, 2000

Attest:

Attesting Officer

*Acting Commissioner of Patents and Trademarks*